(12) United States Patent
Ho

(10) Patent No.: US 9,471,800 B2
(45) Date of Patent: *Oct. 18, 2016

(54) SECURING VISUAL INFORMATION ON IMAGES FOR DOCUMENT CAPTURE

(71) Applicant: EMC Corporation, Hopkinton, MA (US)

(72) Inventor: Ming Fung Ho, Fremont, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/685,280

(22) Filed: Apr. 13, 2015

(65) Prior Publication Data

US 2015/0213283 A1      Jul. 30, 2015

Related U.S. Application Data

(63) Continuation of application No. 13/720,654, filed on Dec. 19, 2012, now Pat. No. 9,032,545.

(51) Int. Cl.

| | |
|---|---|
| *G06F 21/60* | (2013.01) |
| *G06F 21/62* | (2013.01) |
| *G06K 9/00* | (2006.01) |
| *G06Q 10/10* | (2012.01) |
| *H04L 29/06* | (2006.01) |

(52) U.S. Cl.
CPC ............... *G06F 21/62* (2013.01); *G06F 21/60* (2013.01); *G06F 21/6218* (2013.01); *G06K 9/00456* (2013.01); *G06Q 10/10* (2013.01); *H04L 63/10* (2013.01)

(58) Field of Classification Search
CPC .... G06F 21/60; G06F 21/6218; G06F 21/62; G06Q 10/10; G06K 9/00456; H04L 63/10
USPC ............................................... 726/28
See application file for complete search history.

(56) References Cited

U.S. PATENT DOCUMENTS

| | | | | |
|---|---|---|---|---|
| 5,191,525 A | * | 3/1993 | LeBrun | ..................... B07C 3/00 707/E17.009 |
| 2012/0216290 A1 | * | 8/2012 | Roy | ......................... G06F 21/10 726/27 |

* cited by examiner

*Primary Examiner* — Kambiz Zand
*Assistant Examiner* — Benjamin Kaplan
(74) *Attorney, Agent, or Firm* — Van Pelt, Yi & James LLP

(57) ABSTRACT

Techniques to provide secure access to data are disclosed. An indication that an operator is assigned to index a data value extracted from a document image is received. A snippet or other partial image showing just a portion of the document image that includes a text or other content image portion that corresponds to the data value extracted from the document image is displayed to the operator. The data value is included in a subset of data values extracted from the document image, and access to the subset of extracted data values is provided to the operator without providing access to one or more other portions of the document image associated with extracted data values not included in the subset.

20 Claims, 8 Drawing Sheets

SECURING VISUAL INFORMATION ON IMAGES FOR DOCUMENT CAPTURE

CROSS REFERENCE TO OTHER APPLICATIONS

This application is a continuation of co-pending U.S. patent application Ser. No. 13/720,654, entitled SECURING VISUAL INFORMATION ON IMAGES FOR DOCUMENT CAPTURE filed Dec. 19, 2012 which is incorporated herein by reference for all purposes.

BACKGROUND OF THE INVENTION

In document capture, a paper document is scanned and may contain confidential information such as credit card numbers, taxpayer ID, etc. While it is possible for such data to be automatically extracted using optical character recognition, it is not always accurate and there may be a need for a human operator to validate the information against what is on the paper. If the operator has access to the document image, then the confidential information may be exposed, unless it is redacted.

Redaction requires additional processing and/or human work, and is prone to errors and omissions, e.g., due to information appearing in an unexpected place, such as handwritten in a margin, and/or due to information that should be protected from disclosure appearing in multiple places in a document and not being redacted in all places.

BRIEF DESCRIPTION OF THE DRAWINGS

Various embodiments of the invention are disclosed in the following detailed description and the accompanying drawings.

DETAILED DESCRIPTION

Figure 1:
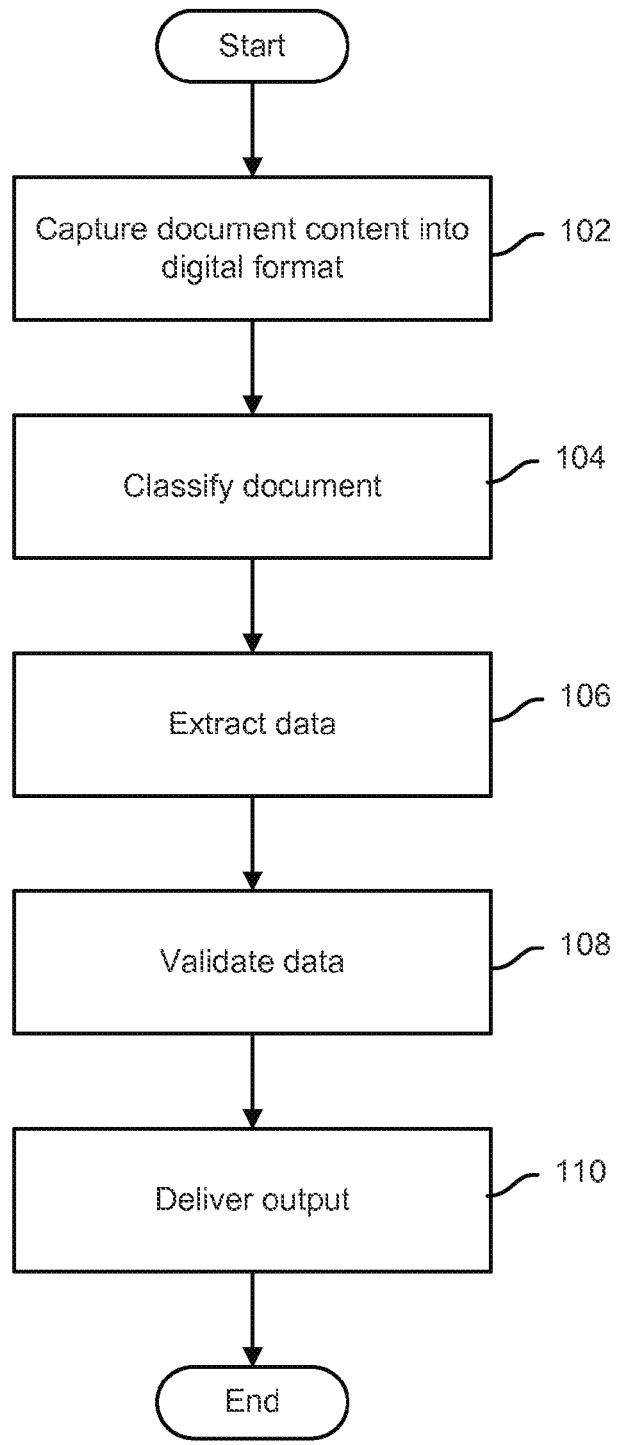
FIG. 1 is a flow chart illustrating an embodiment of a process to capture data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Performing data validation in a document capture context by selectively displaying to a given operator only those document portions that correspond to data entry form fields to be validated by that operator is disclosed. In document capture and initial data extraction, the location within the document image of the text or other content image that was processed to determine the extracted data value for a specific corresponding data entry form field is determined and recorded. The known location of each text field is used in data validation to display to a particular operator only the portion of the original document image that corresponds to that field, such as a snippet. The original document image (full page or pages), and any portions not to be validated by that operator, may be hidden from the operator. In some embodiments, only data entry form fields to be validated by an operator are made available to be displayed to that operator. In some embodiments, by hiding a data entry form field that the operator is prohibited from seeing, the corresponding snippet or other partial image of the original document image is also hidden.

FIG. 1 is a flow chart illustrating an embodiment of a process to capture data. In the example shown, document content is captured into a digital format (102), e.g., by scanning the physical sheet(s) to create a scanned image. The document is classified (104). In some embodiments, classification includes detecting a document type corresponding to an associated data entry form. Data is extracted from the digital content (106), for example through optical character recognition (OCR) and/or optical mark recognition (OMR) techniques. Extracted data is validated (108). In various embodiments, validation may be performed at least in part by an automated process, for example by comparing multiple occurrences of the same value, by performing computations or other manipulations based on extracted data, etc. In various embodiments, all or a subset of extracted values, e.g., those for which less than a required degree of confidence is achieved through automated extraction and/or validation, may be validated manually, by a human indexer or other operator. Once all data has been validated, output is delivered (110), e.g., by storing the document image and associated data in an enterprise content management system or other repository.

Figure 2:
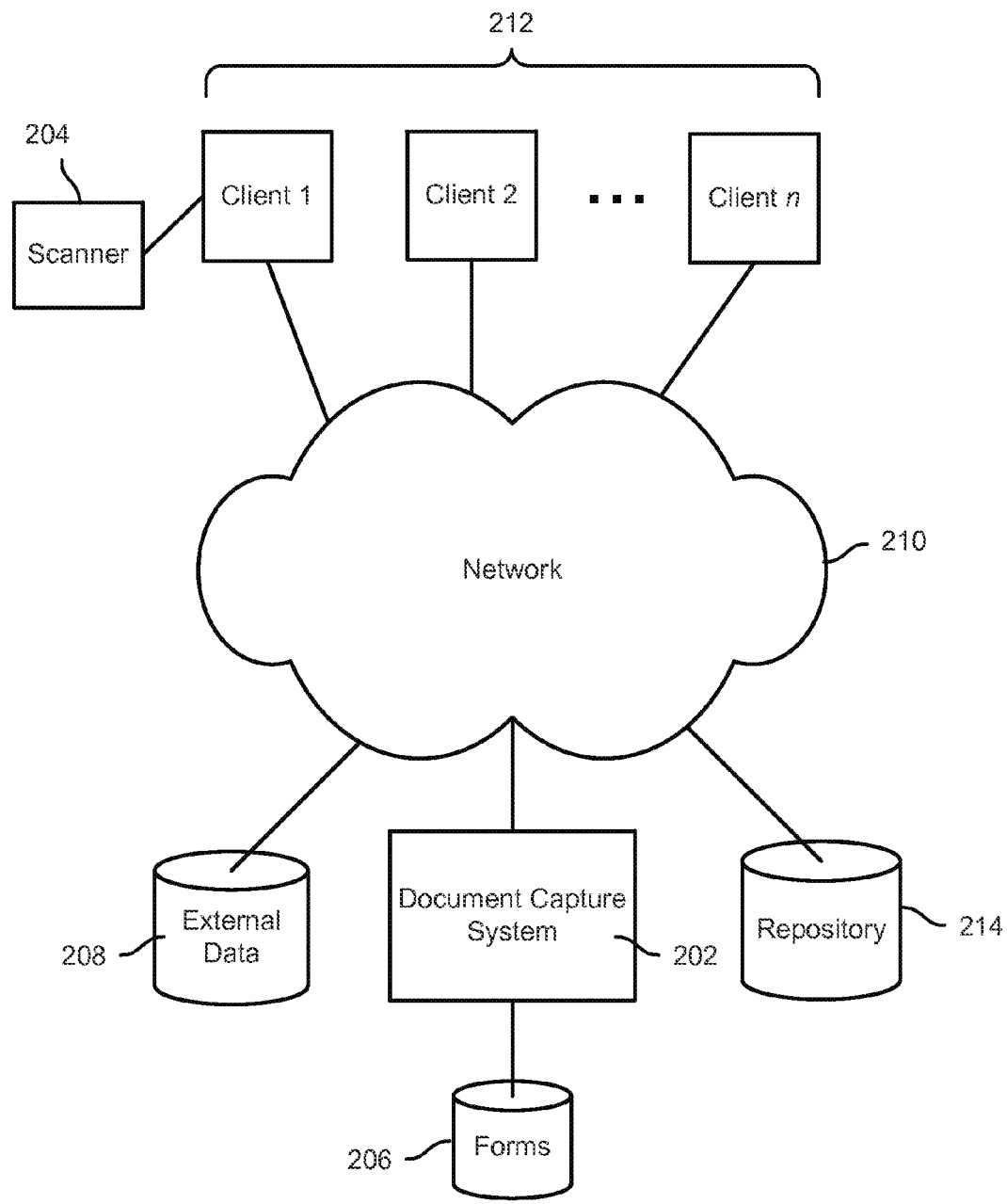
FIG. 2 is a block diagram illustrating an embodiment of a document capture system and environment.

FIG. 2 is a block diagram illustrating an embodiment of a document capture system and environment. In the example shown, a client system 212 is attached to a scanner 204.

Documents are scanned by scanner 204 and the resulting document image is sent by the client system 212 to document capture system 202 for processing, e.g., using all or part of the process of FIG. 1. In the example shown, document capture system 202 uses a library of data entry forms 206 to create a structured representation of data extracted from a scanned document. For example, as in FIG. 1 steps 104 and 106, in some embodiments a document is classified by type and an instance of a corresponding data entry form is created and populated with data values extracted from the document image. In some embodiments, data validation may be performed, at least in part, by document capture system 202 by accessing external data 208 via a network 210. For example, an external third party database that associates street addresses with correct postal zip codes may be used to validate a zip code value extracted from a document. In the example shown, validation may be performed at least in part by a plurality of manual indexers each using an associated client system 212 to communicate via network 210 with document capture system 202. For example, document capture system 202 may be configured to queue human validation tasks and to serve tasks out to indexers using clients 212. Each client system 212 may use a browser based and/or installed client software provided functionality to validate data as described herein. In some embodiments, once validation has been completed the resulting raw document image and/or form data are delivered as output, for example by storing the document image and associated form data in a repository 214, such as an enterprise content management (ECM) or other repository.

Figure 3:
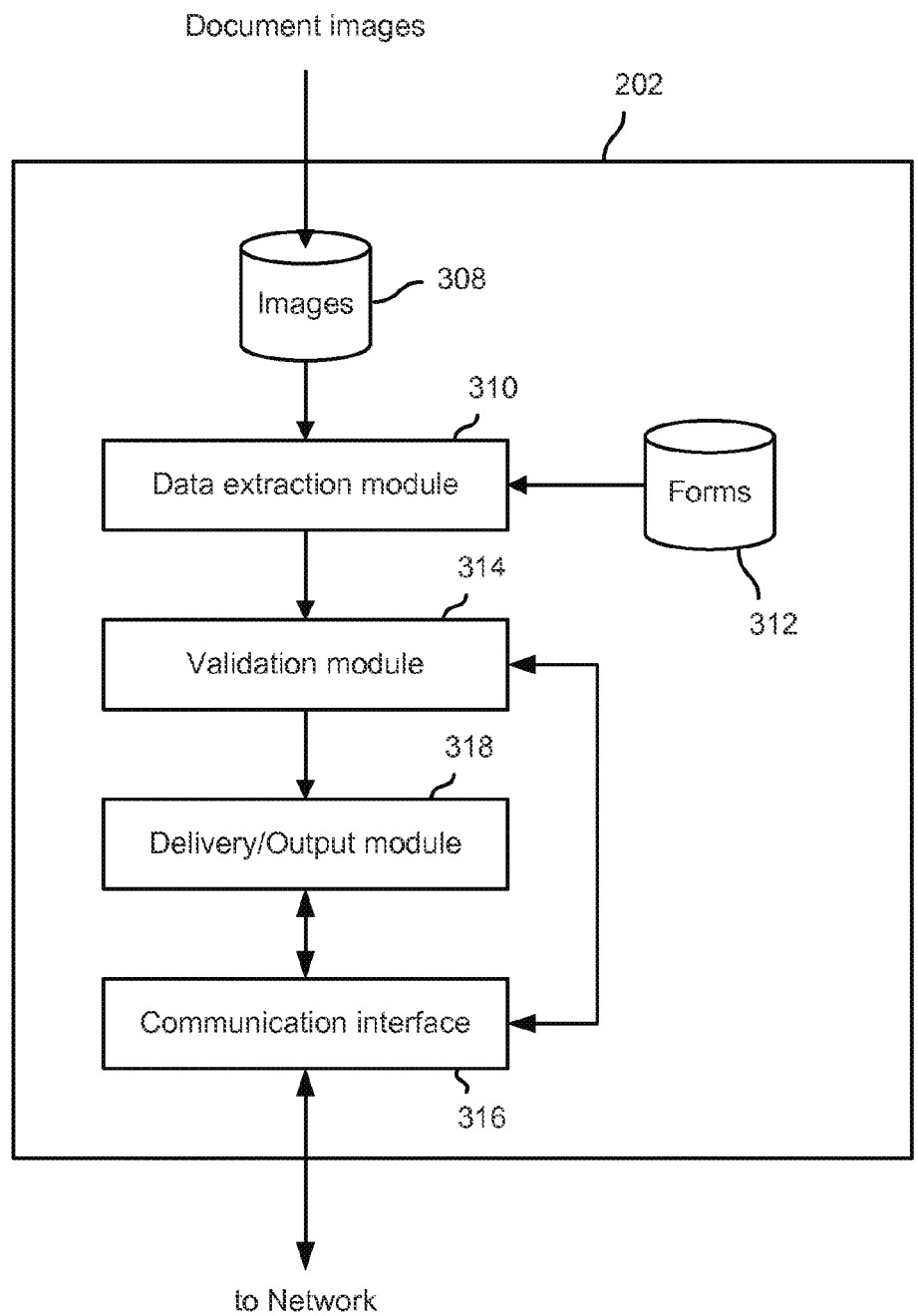
FIG. 3 is a block diagram illustrating an embodiment of a document capture system.

FIG. 3 is a block diagram illustrating an embodiment of a document capture system. In the example shown, the document capture system 202 of FIG. 2 is shown to receive document image data, e.g., via network 204 from a scanning client system 212. Document image data is received in some embodiments in batches and is stored in an image store 308. Document image data is provided to a data extraction module 310 which uses a data entry forms library 312 to classify each document by type and create an instance of a type-specific data entry form. Data extraction module 310 uses OCR, OMR, and/or other techniques to extract data values from the document image and uses the extracted values to populate the corresponding data entry form instance. In some embodiments, data extraction module 310 may provide a score or other indication of a degree of confidence with which an extracted value has been determined based on a corresponding portion of the document image. In some embodiments, for each data entry form field a corresponding location within the document image from which the data value entered by the extraction module in that form field was extracted, for example the portion that shows the text to which OCR or other techniques were applied to determine the text present in the image, is recorded. In the example shown, the data extraction module 310 provides the populated form to a validation module 314 configured to perform validation (automated and/or human as configured and/or required). In some embodiments, the validation module 314 applies one or more validation rules to identify fields that may require a human operator to validate. In the example shown, the validation module 314 may communicate via a communications interface 316, for example a network interface card or other communications interface, to obtain external data to be used in validation and/or to generate and provide to human indexers via associated client systems, such as one or more of clients 212 of FIG. 2, tasks to perform human/manual validation of all or a subset of form fields. The validated data is provided to a delivery/ output module 318 configured to provide output via communication interface 316, for example by storing the document image and/or extracted data (structured data as capture using the corresponding data entry form) in an enterprise content management system or other repository.

Figure 4:
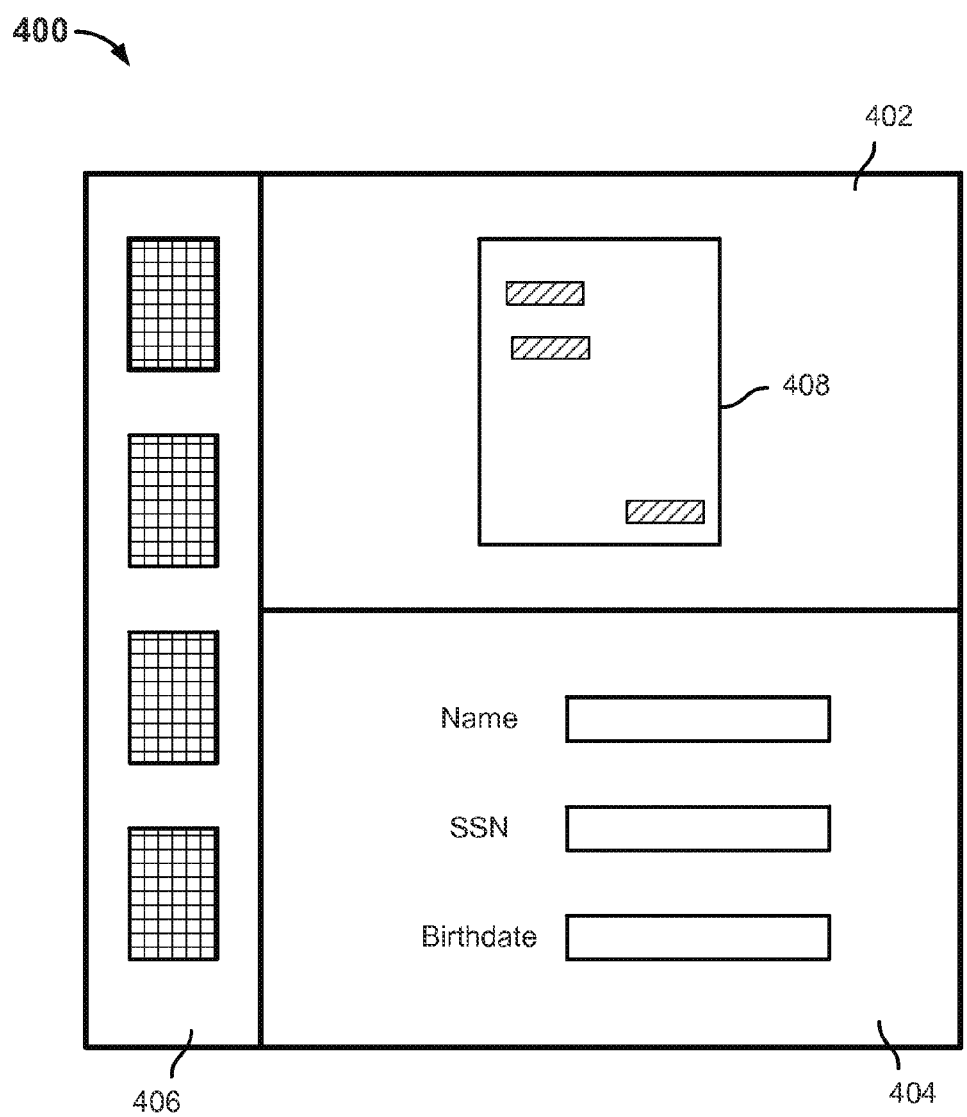
FIG. 4 is a block diagram illustrating an embodiment of a data validation user interface.

FIG. 4 is a block diagram illustrating an embodiment of a data validation user interface. In the example shown, validation interface 400 includes a document image display area 402, a data entry form interface 404, and a navigation frame 406. A document image 408 is displayed in document image display area 402. In the example shown, portions of document image 408 that correspond to data entry form fields in the form shown in data entry form interface 404 are highlighted, as indicated in FIG. 4 by the cross-hatched rectangles in document image 408 as shown. In this example, thumbnails are shown in navigation pane 406, each corresponding for example to an associated document and/or page from which data has been captured. In this example, the topmost thumbnail image as shown in navigation frame 406 of FIG. 4 is highlighted (thicker outer outline), indicating that document image 408 as displayed in document image display area 402 corresponds to the topmost thumbnail. In some embodiments, controls are provided (e.g., on screen controls, key stokes or combinations, etc.) to enable the operator to pan, scroll, and/or zoom in/out with respect to the document image 408, for example to focus and zoom in on (magnify) a particular portion of the document image 408. In some embodiments, as the operator validates each field a cursor advances to the next field and a corresponding portion of the document image 408 is highlighted.

Figure 5:
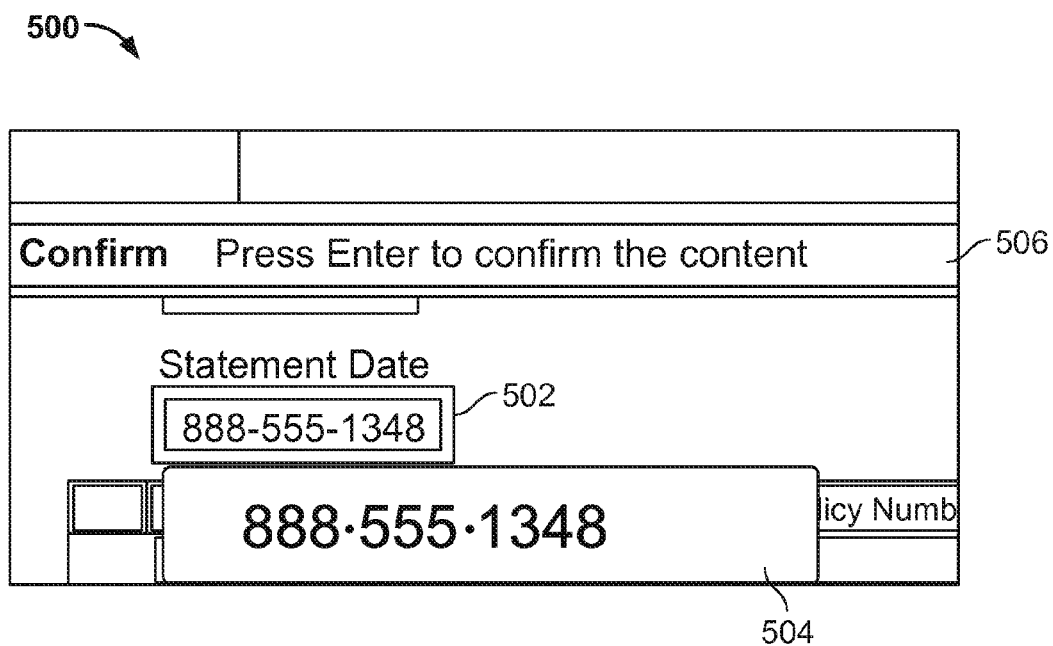
FIG. 5 is a screen shot illustrating an embodiment of a technique to minimize eye strain and/or fatigue in manual indexing.

FIG. 5 is a screen shot illustrating an embodiment of a technique to minimize eye strain and/or fatigue in manual indexing. In the example shown, partial screen shot 500 includes a portion of a manual data validation user interface that includes a data entry form field 502, in this example with a current value of "888-555-1348" displayed, and nearby to the form field, as displayed in the data entry form portion of the data validation interface, a snippet 504 taken from a corresponding document image, which shows just the portion of the document image that contains the image of the text (in this case numerical values) extracted from the document to populate the form field 502. In this example, a confirmation or other informational and/or error message 506 similarly is displayed near the form field 502. As a result, the form field 502, corresponding snippet 504, and confirmation message 506 are all in the line of sight, or nearly so, at the same time, enabling all information required to validate the value entered in the form field 502, including entering any correction that may be required, to be viewed at the same time and/or with minimal eye or head movement and without requiring the operator to scan back and forth between the document image frame and the data entry form, and/or to scroll, pan, or zoom in/out in the document image as viewed to locate and scale to a readable size the text to be validated. In some embodiments, the snippet 504 is scaled to ensure readability, for example by including in the snippet only (or mostly) the text to be validated and scaling the image to a readable size, for example until the image is of at least a prescribed minimum size and/or the displayed characters are of a prescribed minimum "point" or other size.

In some embodiments, as an operator finishes validation of a field, indicated for example by pressing the "enter" key or selecting another key or on screen control, the system automatically pans to the next data entry form field, retrieves and displays near the form field a corresponding document image snippet. In this way, the operator can navigate through the form and corresponding portions of the document image without retargeting, i.e., without having to redirect their eyes to a different point or points on the screen.

Figure 6:
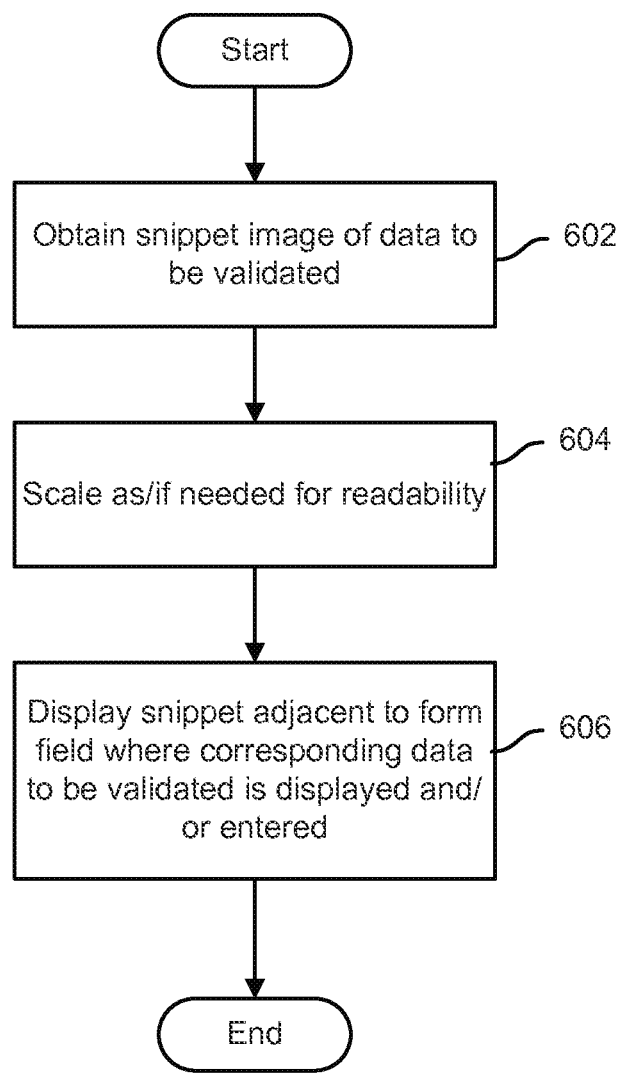
FIG. 6 is a flow chart illustrating an embodiment of a process to facilitate manual indexing.

FIG. 6 is a flow chart illustrating an embodiment of a process to facilitate manual indexing. In various embodiments, the process of FIG. 6 is used to provide an interface such as the one shown and described above in connection with FIG. 5. In the example shown in FIG. 6, a snippet containing the text or other document image portion corresponding to a data entry form field to be validated is obtained, and an association between the snippet and/or the associated location in the document image, on the one hand, and the corresponding form field, on the other hand, is stored (602). The snippet is scaled as/if need for readability (604). The scaled (if applicable) snippet is displayed adjacent or otherwise near to the form field where corresponding extracted data to be validated is displayed and/or entered (606).

In various embodiments, the techniques disclosed above are applied to provide secure validation and/or entry of data in a document capture or other manual indexing context. Data validation and/or other manual index is performed, using techniques disclosed herein, by displaying to any given operator only those portions of a document image that the operator may need to view to perform tasks assigned to that operator.

As noted above, human redaction, even if fully effective, still exposes confidential information due to unforeseen circumstances and introduces a point of slow-down as documents are funneled through this small set of privileged operators for visual inspection. Potential disadvantages of automatic redaction include, without limitation: a) it requires an additional process step to manipulate the image and add redaction marks and manage the redacted images; b) for dynamic privilege-based scenarios, where different operators may be allowed to see different combinations of secured fields, redaction is impractical because there are too many combinations of redacted pages that may be required; and c) it is possible for redactions to be applied incorrectly. For semi-structured documents (for example, invoices that can be structurally different), or information that is not written in the expected area, it is possible for the sensitive data to be located outside of the redaction. In this way, an operator who has access to a full page image may still be able to see that data.

Figure 7:
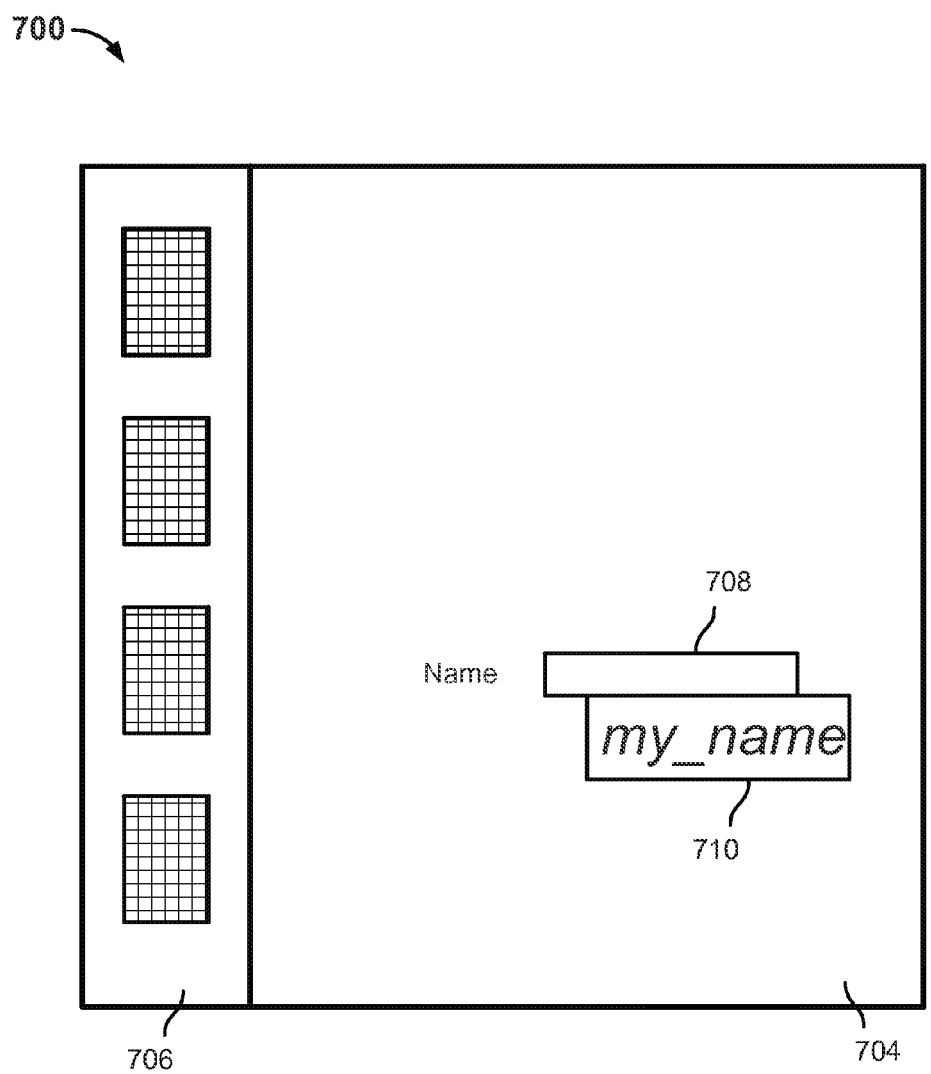
FIG. 7 is a block diagram illustrating an embodiment of a secure indexing interface.

FIG. 7 is a block diagram illustrating an embodiment of a secure indexing interface. In various embodiments, the interface 700 of FIG. 7 may be used to perform secure data validation in a document capture context. In the example shown, the interface 700 includes a data entry form area 704, and a navigation pane 706, similar to the corresponding regions of the example shown in FIG. 4. In the secure interface 700 of FIG. 7, however, there is no document image display area and navigation pane 706 does not show the page thumbnail. The operator has no way to see the page image and access will be limited to image portions (e.g., snippets) that correspond to specific data entry form fields that the operator has been assigned to validate. In addition, in this example navigation pane 706 only allows navigation between documents, and not between pages as in navigation pane 406.

In the example shown in FIG. 7, a "Name" form field 708 is displayed, along with a corresponding snippet 710 of the original document image, e.g., a portion the system has remembered is associated with the "Name" field 708. In the same manner as described above, for example, in various embodiments an operator may iterate through only those fields assigned to that operator for validation, and access to document image data may in that way be limited to those snippets that correspond to the data entry fields assigned to that operator for validation, and access to all other portions of the document image blocked.

Figure 8:
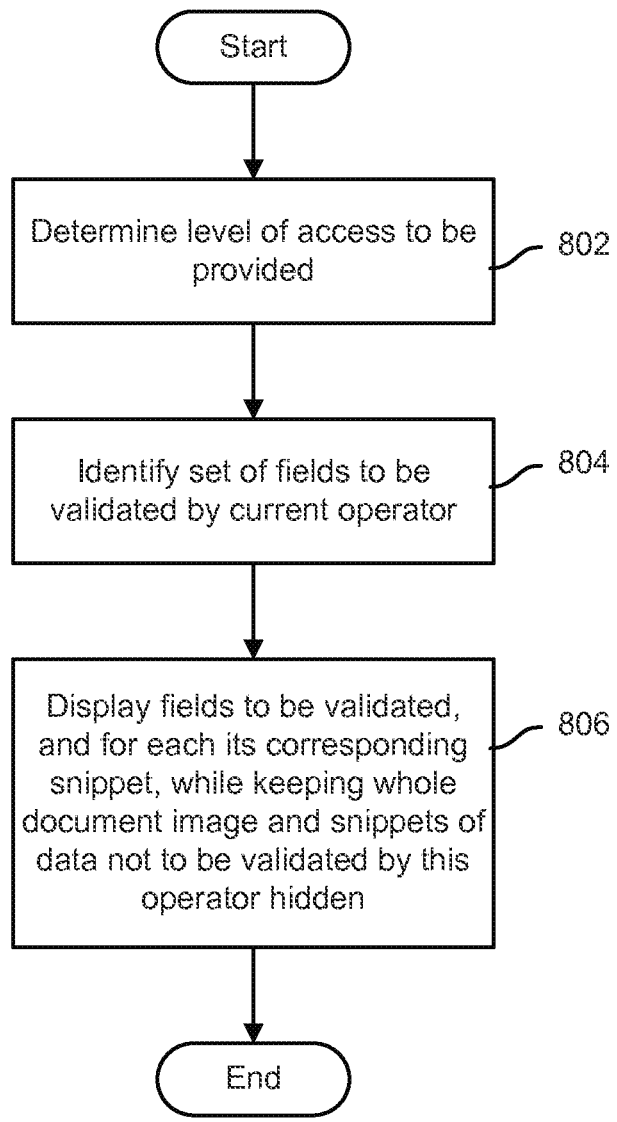
FIG. 8 is a flow chart illustrating an embodiment of a process to index data.

FIG. 8 is a flow chart illustrating an embodiment of a process to index data. In the example shown, a level of access to be provided to a particular operator is determined (802). For example, access levels may be defined by role, group, and/or individual identity or profile. Users or groups that have only bonded and/or supervisory level workers, for example, may have access to more information and/or more or different combinations of fields than less experienced, less senior, and/or less trusted workers. A set of data entry form fields to be validated by a current operator is identified (804). In some cases, the data entry fields comprising a form may be validated by two or more operators, with each being provided access to a permitted combination of form fields. For example, one operator may validate the name and other identifying information while a different operator may validate the SSN or other taxpayer identifier, ensuring that neither has access to both pieces of information (i.e., the name/SSN pair or association). Likewise, in a health records context, one operator may validate name data while another operator to whom the name portion(s) of the document, and random or unknown portions in which the name may appear, are not displayed may validate text that describes the patient's health and/or treatment details, etc. In various embodiments, a configured and/or administrator configurable rule, policy, or other definition may be applied to identify a subset of extracted data values that may be displayed to a given operator. Once determined, the field(s) to be validated by the current operator, and for each its associated snippet of the document image, are displayed (for example, in sequence) to the operator for validation (806).

Using techniques disclosed herein, document capture users are able to perform document capture while disclosing potentially sensitive information to human operators on a "need to know" basis. In various embodiments, no part of the original page is exposed to any given operator, except for those zones required by the validation or other task assigned to that operator. To support scenarios where the original page cannot be legally sent to third party operators, the original page is also not sent to the client 212. In addition, no additional configuration is needed for redaction, and the document capture process does not need to create and manage redacted pages.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing secure access to data extracted from a document image, comprising:
classifying the document image according to document type;
creating an instance of a type-specific data entry form corresponding to the document image;
extracting data from the document image;
populating the instance of the type-specific data entry form corresponding to the document image using the data extracted from the document image;
receiving an indication that an operator is assigned to index a data value extracted from a document image; and displaying to the operator a subset of the instance of the type-specific data entry form corresponding to the document image so as to show just a portion of the document image that includes a text or other content image portion that corresponds to the data value extracted from the document image.

2. The method of claim 1, further comprising not providing access to the entire document image.

3. The method of claim 1, further comprising determining in the course of document capture and storing for each data value extracted a corresponding location in the document image relating to the subset of the instance of the type-specific data entry form corresponding to the document image that was used to extract that data value.

4. The method of claim 3, further comprising storing the instance of the type-specific data entry form corresponding to the document image.

5. The method of claim 1, further comprising determining the subset of extracted data values to be displayed to the operator.

6. The method of claim 5, wherein the operator comprises a first operator, the subset of extracted data values comprises a first subset of extracted data values, and further comprising assigning to a second operator a second subset of the extracted data values.

7. The method of claim 5, wherein determining the subset of extracted data values to be displayed to the operator includes determining a permitted combination of extracted data values that can be displayed to the operator.

8. The method of claim 7, wherein the determination is based at least in part on one or more of an identity, a role, a group membership, a level of trust, and another attribute associated with the operator.

9. The method of claim 5, wherein determining the subset of extracted data values to be displayed to the operator includes applying one or more of a rule, a policy, and another definition.

10. The method of claim 1, further comprising determining the subset of the instance of the type-specific data entry form corresponding to the document image to show to the operator according to a degree of confidence with which the data value has been determined based on a corresponding portion of the document image.

11. A system to provide secure access to data extracted from a document image, comprising:
a display device; and
a processor coupled to the display and configured to:
classify the document image according to document type;
create an instance of a type-specific data entry form corresponding to the document image;
extracting data from the document image;
populate the instance of the type-specific data entry form corresponding to the document image using the data extracted from the document image;
receive an indication that an operator is assigned to index a data value extracted from a document image; and
display to the operator via the display device a subset of the instance of the type-specific data entry form corresponding to the document image so as to show just a portion of the document image that includes a text or other content image portion that corresponds to the data value extracted from the document image.

12. The system of claim 11, wherein the processor is further configured to determine and store for each data value extracted from the document image a corresponding location in the document image of the data associated with subset of the instance of the type-specific data entry form corresponding to the document image that was used to extract that data value.

13. The system of claim 12, wherein the processor is further configured to store the instance of the type-specific data entry form corresponding to the document image.

14. The system of claim 11, wherein the processor is further configured to determine the subset of extracted data values to be displayed to the operator.

15. The system of claim 14, wherein the operator comprises a first operator, the subset of extracted data values comprises a first subset of extracted data values, and the processor is further configured to assign to a second operator a second subset of the extracted data values.

16. The system of claim 14, wherein determining the subset of extracted data values to be displayed to the operator includes determining a permitted combination of extracted data values that can be displayed to the operator.

17. The system of claim 16, wherein the determination is based at least in part on one or more of an identity, a role, a group membership, a level of trust, and another attribute associated with the operator.

18. The system of claim 14, wherein determining the subset of extracted data values to be displayed to the operator includes applying one or more of a rule, a policy, and another definition.

19. The system of claim 11, wherein the processor is configured to provide to the operator access to the subset of extracted data values and for each a subset of the instance of the type-specific data entry form corresponding to the document image without providing access to one or more other portions of the document image associated with extracted data values not included in the subset at least in part by assigning to the operator a task set that includes validation of just the extracted data values included in the subset and wherein the processor is further configured to provide to any given operator access only to subset of the instance of the type-specific data entry form corresponding to the document image associated with extracted data values assigned to that operator to be validated.

20. A computer program product to provide secure access to data extracted from a document image, the computer program product being embodied in a tangible computer readable storage medium and comprising computer instructions for:
classifying the document image according to document type;
creating an instance of a type-specific data entry form corresponding to the document image;
extracting data from the document image;
populating the instance of the type-specific data entry form corresponding to the document image using the data extracted from the document image;
receiving an indication that an operator is assigned to index a data value extracted from a document image; and
displaying to the operator a subset of the instance of the type-specific data entry form corresponding to the document image so as to show just a portion of the document image that includes a text or other content image portion that corresponds to the data value extracted from the document image.

* * * * *